Patented Mar. 5, 1946

2,396,152

UNITED STATES PATENT OFFICE 2,396,152

INITIATING EXPLOSIVE COMPOSITION

Lawton Arthur Burrows, Woodbury, N. J., assignor to E. I. du Pont de Nemours & Company, Wilmington, Del., a corporation of Delaware No Drawing. Application October 9, 1940, Serial No. 360,412

6 Claims. (Cl. 52—4)

This invention relates to the art of initiating devices; e. g. blasting initiators and the like.

This art has long sought an initiating explosive composition which can be charged readily and which is characterized by certain safety properties. One of these properties in the ability to burn, rather than explode when subjected to the spit of a fuse when unconfined.

The object of my invention is a new and improved explosive composition. A further object is such a composition in free-flowing form and characterized by improved safety properties. Other objects will be appreciated from the following description of my invention.

The foregoing objects are attained by the explosive composition of my invention, which comprises granular free-flowing coherent aggregates of diazodinitrophenol with a solid nitrated polyhydric alcohol of the formula $C_nH_{n+2}(OH)_n$. Preferably the granular aggregates of these materials are produced by intermingling them in the presence of a solvent for the solid nitrated alcohol, and then graining the wet mixture by screening. Preferably, the solid nitrated polyhydric alcohol is dissolved in an amount of solvent just sufficient to make and maintain said solution. This may be done directly or by dissolving the material in an excess of solvent and then adding water until the solid almost begins to precipitate out of solution. While agitating vigorously, there is added gradually a predetermined quantity of diazodinitrophenol. After the ingredients are thoroughly intermixed, an excess of water is added (the agitation being continued) to insure complete precipitation of the solid nitrated polyhydric alcohol from solution. The precipitate is separated by filtration, and while still wet, is grained to the desired size by passing through a screen having openings of appropriate dimensions. The grained product is then dried.

The following examples disclose details of the preparation of free-flowing explosive compositions made in accordance with the present invention. Said examples, of course, are set forth as specific embodiments and are not intended as limitations of the present disclosure.

Example I 85.5 grams of mannitol hexanitrate, hereafter referred to as nitromannite, was dissolved in 473 cc. of acetone. 430 cc. of water was then added to the solution, which was agitated vigorously. If the agitation is ceased momentarily, there is apparent the formation of two layers of the liquid, the bottom layer containing the nitromannite being oily in appearance. To this mixture during agitation, was added 171 grams of suitable diazodinitrophenol which was not free-flowing, but instead tended to mat together. After the diazodinitrophenol crystals had been thoroughly intermixed with the liquid, 3 liters of water was added gradually. The mixture was agitated vigorously throughout the foregoing steps of the procedure. The precipitate formed was then filtered, and while still wet was passed through a 29-mesh silk bolting cloth. The grained material was dried. Examination of the dried material showed it to be made up of coarse, free-flowing granules composed of coherent aggregates of both nitromannite and diazodinitrophenol. The product could be loaded mechanically into blasting cap shells and the like.

Example II

The following ingredients were treated in accordance with the procedure set forth in Example I. 60 grams of erythritol tetranitrate was dissolved in 220 cc. of acetone, following which 200 cc. of water was added to the solution. 180 grams of diazodinitrophenol was then introduced, and the erythritol tetranitrate was precipitated by the addition of approximately 1400 cc. of water. The precipitated material was grained by passing through a 30-mesh silk bolting cloth, and was then dried. The finished product was composed of free-flowing aggregates comprising crystals of erythritol tetranitrate and diazodinitrophenol, said crystals being firmly attached to each other.

Example III 30 grams of nitromannite was dissolved in 400 cc. of methyl alcohol. Once solution had been effected, only several drops of water were added thereto because these indicated that the solvent was not present in excessive amount, since solid was momentarily precipitated. 90 grams of diazodinitrophenol was then added, while agitating the material vigorously. About 1100 cc. of water was then added, and the precipitate was separated by filtration. The moist precipitate was grained by passing through a 30-mesh standard sieve. After the resultant granules had been dried, they were examined by means of a microscope. As in the foregoing examples, the coarse free-flowing granules in effect were aggregates composed of firmly-bound crystals of diazodinitrophenol and the graining agent.

In addition to erythritol tetranitrate and nitromannite, other solid nitrated polyhydric alcohols which are suitable include nitrated dulcitol, nitrated sorbitol, and the like. All these materials, besides being explosive in character, are crystalline at ordinary temperatures, and possess the binding properties necessary for the formation of coherent aggregates with diazodinitrophenol, without tending to form a coating on the surface of the crystals of the latter.

Likewise, it will be understood that various solvents are operative when used in accordance with the present invention, it being essential only that the particular solvent be substantially miscible with water and that it exercise sufficient solvent power to permit dissolution of the nitrated alcohol employed. Thus, in addition to acetone and methanol, solvents which are contemplated include ethanol, mixtures of ethanol and methanol, and some of the higher alcohols and ketones which possess a solvent action with respect to solid nitrated polyhydric alcohols, and which are substantially miscible with water.

As stated hereinbefore, it is preferred to employ the solvent only in amount sufficient to dissolve the nitrated alcohol. Preferably, the material employed as solvent for the nitrated alcohol possesses little, if any, solvent power with respect to the diazodinitrophenol.

The novel diazodinitrophenol-containing composition disclosed herein exhibits upon combustion some truly remarkable properties. One of said properties, which renders this material very desirable from a safety point of view, is its ability, when charged into a blasting cap or similar container, and being otherwise unconfined, of burning instead of detonating when it is ignited. This characteristic is illustrated in the following manner. A quantity of known base charge explosive material, deemed standard for a particular strength blasting cap, is pressed into the blasting cap shell. Pentaerythritol tetranitrate, or its equivalent, may suitably be employed as the base charge material. A charge of the diazodinitrophenol-containing aggregates is loaded into the cap and pressed, said charge representing twice the amount found necessary for priming satisfactorily the particular base charge employed. The cap loaded in this manner is placed in an upright position, and a length of fuse of the type normally employed for the ignition of ordinary or composition blasting caps, is placed in alignment with the open end of the cap, but separated therefrom by a ¼-inch interval. The fuse is then ignited so that the grained material is exposed to the spit of said fuse. When the grained diazodinitrophenol-containing charge is ignited, it merely burns without initiating the base charge. However, if the fuse be inserted in the cap in the usual manner, and the fuse ignited, satisfactory detonation of the base charge is effected. The advantage of an explosive material which possesses the foregoing property will be readily appreciated.

The composition likewise possesses excellent priming power. As stated hereinbefore, the nitrated alcohols disclosed do not tend to coat or cover the diazodinitrophenol treated therewith, but rather the crystals of said nitrated alcohols apparently intermesh or mat with those of diazodinitrophenol, with the result that the crystals of the two materials are firmly bound to form the aforementioned coherent aggregates. This particular physical arrangement of the crystals appears important with respect to the capacity of the product to burn when subjected to the spit of a fuse under the conditions set forth hereinbefore. This conclusion is predicated on the fact that, when diazodinitrophenol is grained with certain other materials such as dextrin and the like, the dextrin tends to form a coating over the crystals. The grained product no longer burns, but instead detonates. Consequently, any material capable of being precipitated as crystals having such shape that they tend to mat or intermesh should be operative, provided that such material does not deter unduly the action of diazodinitrophenol when it is initiated.

The present disclosure makes available to the explosives art a composition which is free-flowing and capable of being loaded mechanically into blasting cap shells and the like, and which possesses excellent priming power. Moreover, its adoption as an explosive charge for various initiators reduces the hazard normally obtaining in the assembly and use of said initiators, because premature or accidental ignition of said material, when pressed into a blasting cap shell or the like, merely causes a burning of the charge in said cap shell, and as a result, obviates the hazards which attend detonation. In effect, the present disclosure provides a composition which not only possesses desired characteristics as an explosive, but also possesses physical properties which permit facile and safe handling thereof.

The amount of solid alcohol which is necessary for the formation of the coherent aggregates disclosed herein, varies rather widely, since it is dependent upon the nitrated alcohol and solvent employed, as well as the procedure followed for intermingling of the constituents. However, it may be determined empirically for any particular combination of materials without undue difficulty. I have found that approximately 1 part of solid nitrated alcohol with from 2 to 4 parts of diazodinitrophenol affords a ratio which yields a desirable product with respect to both physical and explosive properties.

It will be understood that the coherent aggregates need not be grained through a 29 or 30-mesh screen as disclosed in the examples, these screens having been chosen merely because they yielded a granular product of convenient size. Actually, material grained through screens of from 20 to 60-mesh yields a free-flowing product of desirable properties, which will pass readily through a loading plate.

Although the invention has been described in detail in the foregoing, variations may be made from the description without departing from the spirit or scope of the invention. Thus, the diazodinitrophenol and the solid nitrated alcohol may be intermingled in the dry state and then be treated with solvent or a solvent-water mixture. Nor is it essential that the solvent be present in quantity sufficient to dissolve all the solid nitrated alcohol. The composition may be charged readily into any type of initiating device including blasting caps, squibs, percussion primers and the like. I intend, therefore, to be limited only in accordance with the following claims:

I claim:

1. A blasting cap comprising a base charge and a single superposed charge comprising a free-flowing composition composed of coherent aggregates comprising crystals of diazodinitrophenol intermingled with a solid nitrated polyhydric alcohol of the formula $C_nH_{n+2}OH$, said superposed charge being a combined ignition means and primer for the base charge, said charge being approximately twice the amount necessary for priming said base charge, and being characterized by the property of burning instead of detonating when confined only by the cap shell and of detonating when confined by the insertion of a fuse in the cap.

2. The blasting cap of claim 1 wherein the base charge is pentaerythritol tetranitrate.

3. The blasting cap of claim 1, wherein the superposed charge comprises crystals of diazodinitrophenol intermingled with nitromannitol.

4. A blasting cap comprising a base charge and a single superposed charge comprising a free-flowing composition composed of coherent aggregates comprising crystals of diazodinitrophenol intermingled with nitromannitol, said superposed charge being the sole ignition and primer means, being capable upon ignition of burning at a rate below that characterizing detonation when confined solely by pressing into a cap shell, and being approximately twice the minimum amount necessary for priming said base charge.

5. A detonator comprising a charge of pentaerythritoltetranitrate and a single charge directly superimposed thereon, to initiate said pentaerythritoltetranitrate charge, consisting of a compressed coherent admixture of diazodinitrophenol and a solid nitrated polyhydric alcohol of the formula $(C_nH_{n+2}(OH)_n$.

6. A detonator comprising a charge of pentaerythritoltetranitrate and a single charge directly superimposed thereon, to intiate said pentaerythritoltetranitrate charge, consisting of a compressed coherent admixture of diazodinitrophenol and nitromannite.

LAWTON A. BURROWS.